(12) United States Patent
Guertler

(10) Patent No.: US 7,137,605 B1
(45) Date of Patent: Nov. 21, 2006

(54) ACCESSORY MOUNTING DEVICE FOR A TRAFFIC LIGHT ASSEMBLY

(76) Inventor: James J. Guertler, 104 Saddle Brook Dr., Oak Brook, IL (US) 60521

( * ) Notice: Subject to any disclaimer, the term of this patent is extended or adjusted under 35 U.S.C. 154(b) by 154 days.

(21) Appl. No.: 10/993,457

(22) Filed: Nov. 19, 2004

(51) Int. Cl.
*A47B 96/06* (2006.01)
(52) U.S. Cl. .................... 248/214; 248/219.2; 362/431
(58) Field of Classification Search ................ 248/214, 248/219.2, 218.4, 187.1, 639, 309.1; 362/431, 362/152, 153.1
See application file for complete search history.

(56) References Cited

U.S. PATENT DOCUMENTS 5,740,911 A * 4/1998 Chou .......................... 206/378
5,964,444 A * 10/1999 Guertler ...................... 248/548

* cited by examiner

*Primary Examiner*—Ramon O Ramirez
(74) *Attorney, Agent, or Firm*—Mathew R. P. Perrone, Jr.

(57) ABSTRACT

An accessory mounting device is used with a traffic light assembly. The accessory mounting device fits over the top of a mounting pole for a traffic light assembly; due to an enlarged, gripping, lower portion with a mounting cylinder on the top thereof forming the accessory mounting device. The accessory mounting device of this invention supports a desired accessory on a traffic light assembly in a secure fashion, with minimal adverse effect on the traffic light assembly.

14 Claims, 4 Drawing Sheets

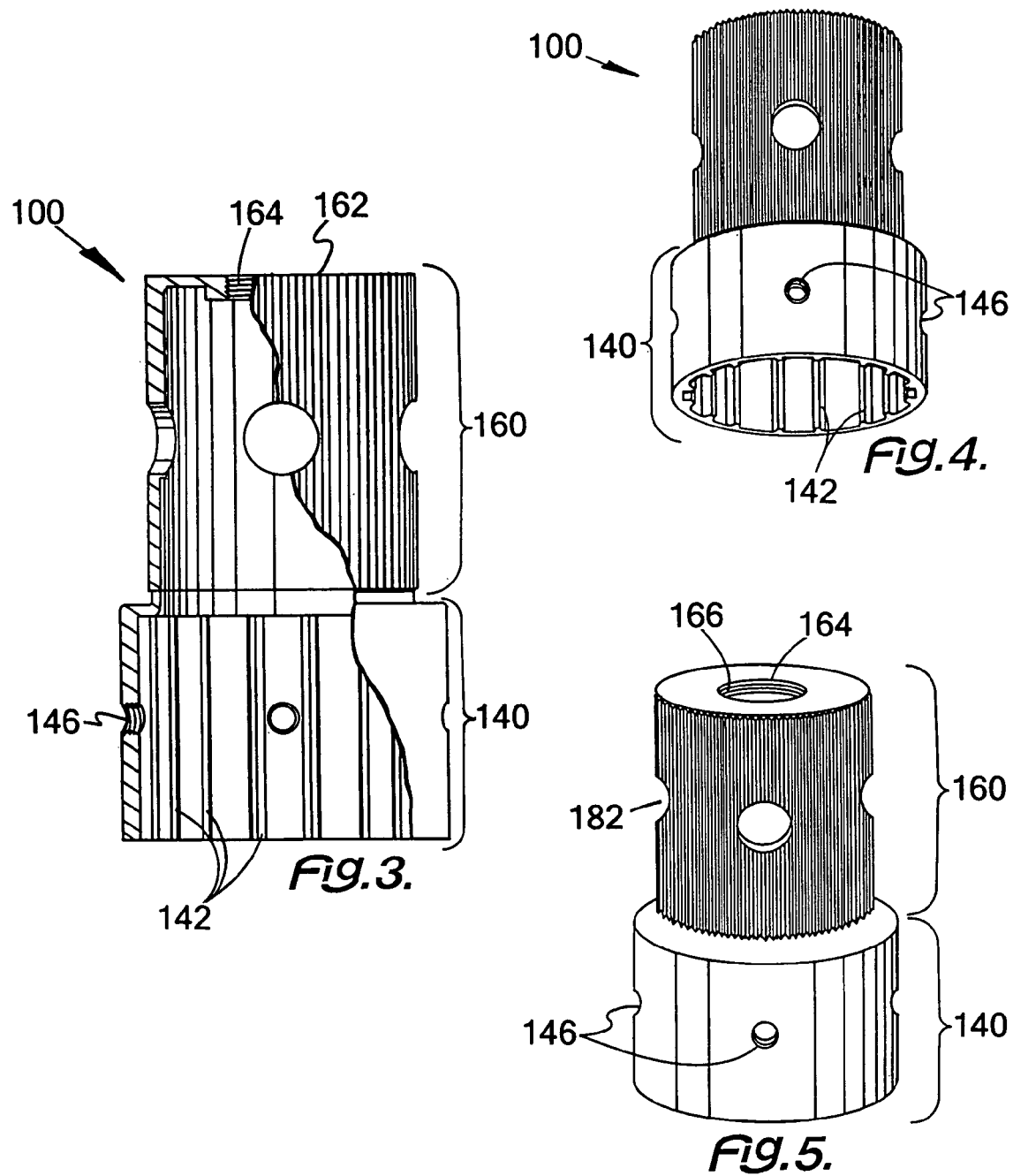

ACCESSORY MOUNTING DEVICE FOR A TRAFFIC LIGHT ASSEMBLY

This invention relates to an attachment for a traffic light assembly and more particularly to an accessory mounting device for a traffic light assembly for supporting a camera or an emergency device on the traffic light assembly.

BACKGROUND OF THE INVENTION

A traffic light is an important feature in traffic control today. Not only does the traffic light provide an efficient means of controlling traffic flow, it adds greatly the safety of drivers on the road. Such features are discussed in U.S. Pat. No. 5,964,444, incorporated herein by reference, which has the same inventive entity as the current application. Within that United States patent is the disclosure of an invention, which facilitates repair and utility of a traffic light assembly.

Like other traffic light structures, the structure disclosed in the referenced patent does not facilitate the attachment of an additional device to the traffic light assembly. The complications of this patented structure and other traffic light supports, are even further complicated, when an additional device is used or desired on the traffic light assembly.

With the advance of technology, it is now possible to use surveillance cameras, antennas, listening devices, infrared detection systems, confirmation beacon lights, remote control devices and other traffic devices around traffic lights. Surveillance cameras can observe people, vehicles or other desired items. Antennas can facilitate transmissions.

Listening devices can locate unusual noises and direct of appropriate responses thereto. For example, a listening device can locate and distinguish a gunshot. Such information is very useful to the authorities.

To efficiently use these devices, however, it is very desirable that any of those desired devices be attached to the traffic light assembly in an efficient manner. Such an attachment must be also with minimal interference with the function of the traffic light and the signals it is required to produce.

An effective procedure for mounting such equipment can be on the existing traffic light supports. However, it is very difficult to accomplish this feature without compromising the effectiveness of the traffic light. It is also difficult to properly position the desired devices on or around the traffic light.

Clearly police and fire authorities, as well as ambulances can function more efficiently if the respective vehicles can pass through an intersection on a green light. To that end, such vehicles may have therein a remote control device, which permits adjusting of a traffic signal from that vehicle. In this fashion, it becomes possible to at least reduce chances of additional accidents. It thus becomes extremely advantageous for such a remote control device to be attached to a traffic signal and efficient fashion.

If the efficiency and effectiveness of attachment to an assembly for a traffic light can be maximized, great advantages can be realized.

SUMMARY OF THE INVENTION

Among the many objectives of this invention is to provide an accessory mounting device for a traffic light assembly, which facilitates attachment of a device to the traffic light assembly.

Another objective of this invention is to provide an accessory mounting device for a traffic light assembly, which facilitates attaching a camera to a traffic light assembly.

Yet another objective of this invention is to provide an accessory mounting device for a traffic light assembly, which facilitates attaching an antenna to a traffic light assembly.

Still another objective of this invention is to provide an accessory mounting device for a traffic light assembly, which facilitates attaching a sound detector to a traffic light assembly.

Additionally, an objective of this invention is to provide an accessory mounting device for a traffic light assembly, which minimizes interference with the function of a traffic light assembly.

Also, an objective of this invention is to provide an accessory mounting device for a traffic light assembly, which simplifies the attachment of a remote control device to the traffic light assembly.

These other objectives and other objectives of the invention (which other objectives become clear upon a person's consideration of the specification, claims and drawings as a whole) are met by providing an accessory mounting device for use in a traffic light assembly. The accessory mounting device fits over the top of a mounting pole for a traffic light assembly; due to an enlarged, gripping, lower portion with a mounting cylinder on the top thereof forming the accessory mounting device.

BRIEF DESCRIPTION OF DRAWINGS

FIG. 3 depicts a side, partially cutaway view of accessory mounting device 100.

FIG. 4 depicts a bottom, perspective view of accessory mounting device 100.

FIG. 5 depicts a top, perspective view of accessory mounting device 100.

Throughout the figures of the drawings where the same part appears in more than one figure, the same number is applied thereto.

DESCRIPTION OF THE PREFERRED EMBODIMENTS

The accessory mounting device of this invention supports a desired accessory on a traffic light assembly in a secure fashion, with minimal adverse effect on the traffic light assembly. The accessory mounting device cooperates with traffic light assembly due to an enlarged, gripping, lower portion with a mounting cylinder on the top thereof forming the accessory mounting device.

Within the enlarged gripping lower portion is a series of ribs substantially parallel to the cylindrical axis. Such ribs add to the gripping power on the accessory mounting device to the traffic light assembly. With the mounting cylinder above the gripping portion, there is no interference with the traffic light assembly, while centrally located in the top end of the mounting cylinder is a threaded aperture providing the female threads.

Those female threads provide support for a mounting rod to fit therein. Different devices may be attached to the mounting rod and provide support for the desired device, whether the device is a mandated device or a desired device.

Figure 1:
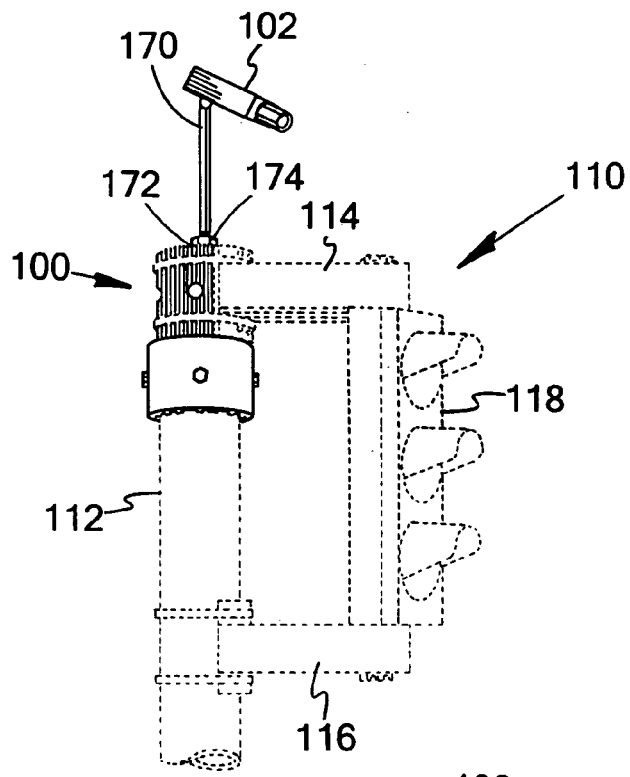
FIG. 1 depicts a perspective view of accessory mounting device 100 of this invention supporting a camera 102 on traffic light assembly 110.
Figure 2:
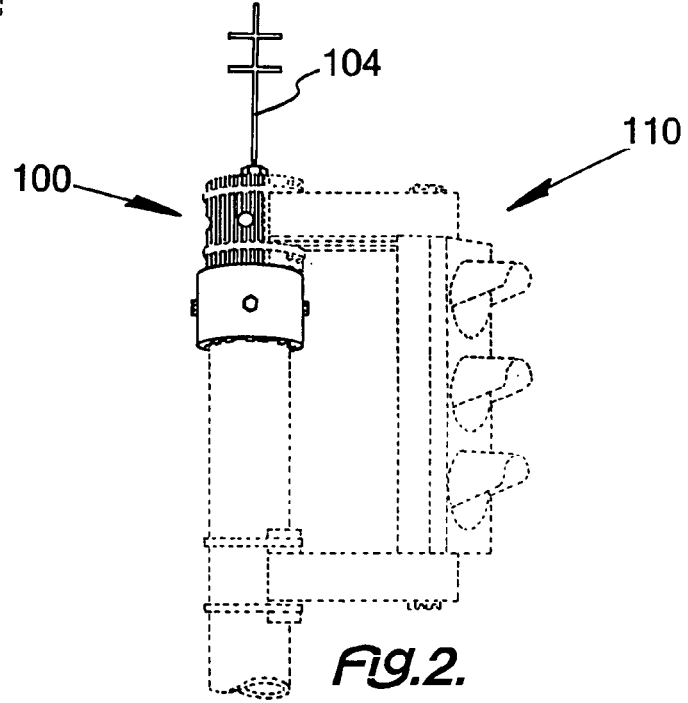
FIG. 2 depicts a perspective view of accessory mounting device 100 supporting an antenna 104 on traffic light assembly 110.
Figure 6:
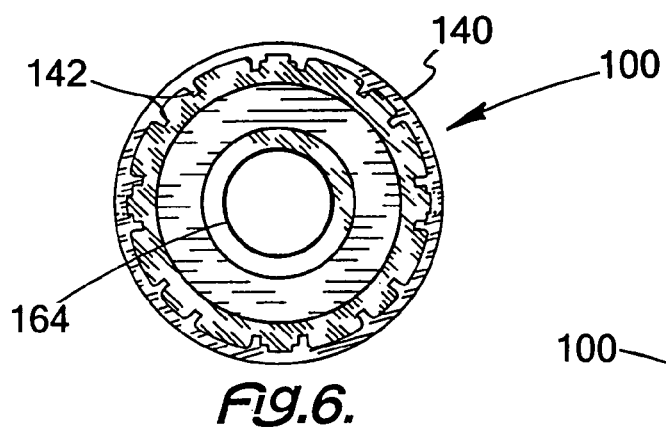
FIG. 6 depicts a bottom, plan view of accessory mounting device 100.
Figure 7:
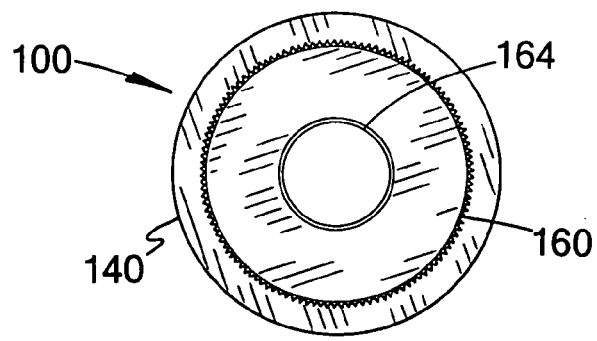
FIG. 7 depicts a top, plan view of accessory mounting device 100.

In FIG. 1 and FIG. 2, the accessory mounting device 100 is shown as it is used in a traffic light assembly 110. The traffic light assembly 110 includes a mounting pole 112. The accessory mounting device 100 is mounted on the top of mounting pole 112. A first upper arm 114 is secured to the accessory mounting device 100. A lower, second arm 116 is mounted to the pole 112. Traffic light housing 118 is secured therebetween. A camera 102 or an antenna 104 is secured in the accessory mounting device 100.

Camera 102 may be any suitable camera. The camera 102 may be a video camera, a film camera, a digital camera, any other suitable camera or combinations thereof. Most preferably, the camera 102 records at least one image and transmits it to a desired site.

Antenna 104 may be any suitable antenna. The antenna 104 may be a radio antenna, a television antenna, a signal receiving antenna, any other suitable antenna or combinations thereof. Typically the antenna may even receive a signal to operate the desired traffic light from a police vehicle or a similar vehicle.

Adding FIG. 3 to the consideration, accessory mounting device 100 has an enlarged, gripping, lower portion 140 with a mounting cylinder 160 on the top thereof forming the accessory mounting device 100. With the mounting cylinder 160 above the gripping portion 140, there is no interference with the traffic light assembly 110. Centrally located in the top end 162 of the mounting cylinder 160 is a threaded aperture 164.

Figure 8:
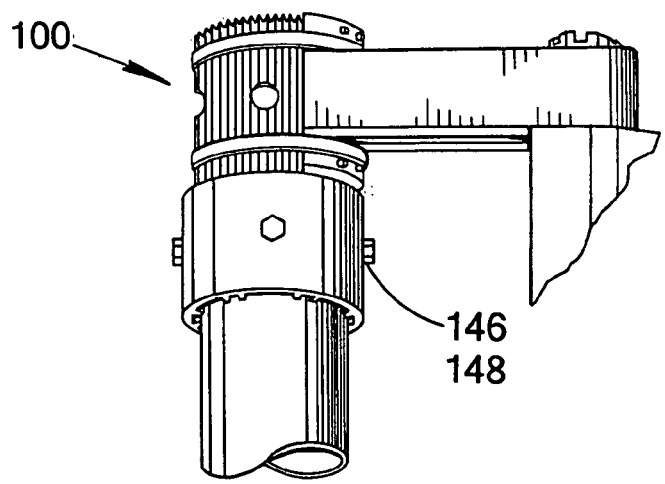
FIG. 8 depicts a perspective view of accessory mounting device 100 of this invention on traffic light assembly 110.

Turning now to FIG. 4, within the enlarged gripping lower portion 140 is a series of ribs 142 substantially parallel to the cylindrical axis of the accessory mounting device 100. Such inner ribs 142 add to the gripping power on the accessory mounting device 100 to the traffic light assembly 110 of FIG. 1 and FIG. 2. Lower apertures 146 (FIG. 8) permit the securing of the accessory mounting device 100 to the traffic light assembly 110, with bolts 148.

With the further consideration of FIG. 5, FIG. 6, FIG. 7, and FIG. 8, mounting cylinder 160 has threaded aperture 164 with female threads 166 therein. Mounting rod 170 (FIG. 1) can have male rod threads 172 communicating with threaded aperture 164 (FIG. 5). Rod nuts 174 on male rod threads 172 may also communicate with threaded aperture 164 and provide additional support for mounting rod 170.

Male rod threads 172 may extend for part or all of the length of mounting rod 170 (FIG. 1). The length of male rod threads is determined by whatever device is desired to be secured to mounting rod 170.

Figure 9:
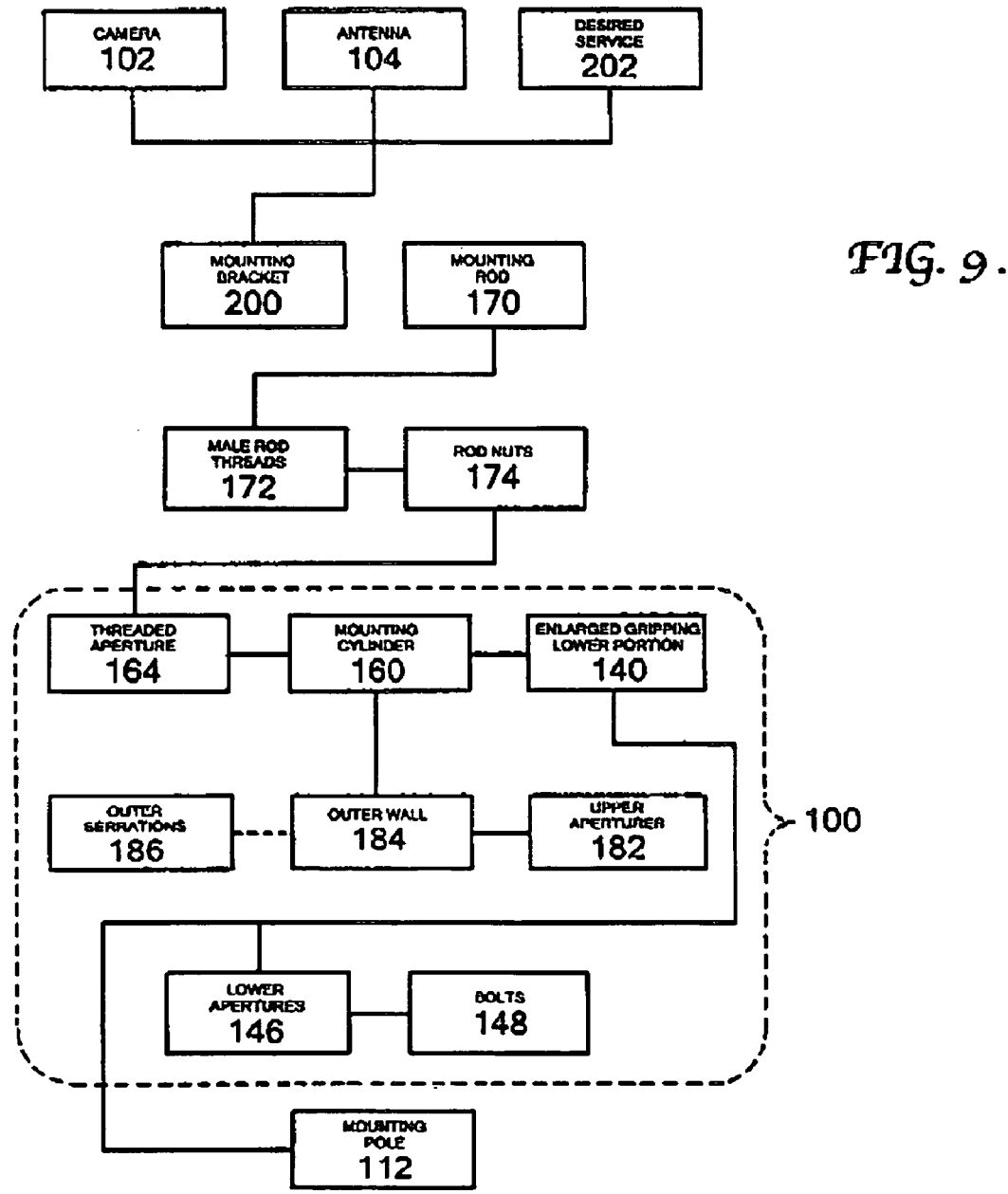
FIG. 9 depicts a box diagram of accessory mounting device 100 of this invention supporting a device 202 on traffic light assembly 110.

With the addition of FIG. 9 to the consideration, mounting rod 170 has a mounting bracket 200 oppositely disposed from male rod threads 172. Rod nuts 174 may be used singly or jointly. When used in pairs, one rod nut 174 is inside accessory mounting device 100, and one rod nut 174 is outside accessory mounting device 100.

Mounting bracket 200 receives camera 102, antenna 104 or any other desired device 202. Mounting bracket 200 can be part of mounting rod 170, attached thereto or part of the device, such as camera 102, antenna 104 or any other desired device 202.

Mounting cylinder 160 has upper apertures 182 (preferably four in number) radially spaced thereabouts and in the same plane. On the outer wall 184 of the upper cylinder 180 are optionally outer serrations 186 surrounding the outer wall 184. Serrations 186 support the traffic light housing 112.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. An accessory mounting device for a traffic light assembly for supporting an emergency device on the traffic light assembly comprising:
   (a) the accessory mounting device having an enlarged, gripping, lower portion and a mounting cylinder;
   (b) the enlarged, gripping, lower portion having the mounting cylinder on the top thereof forming the accessory mounting device;
   (c) the mounting cylinder having an accessory receiving means;
   (d) the accessory receiving means including a threaded aperture;
   (e) the threaded aperture being situated in a top portion of the mounting cylinder; and
   (f) the threaded aperture providing minimal adverse effect on the traffic light assembly.

2. The accessory mounting device of claim 1 further comprising:
   (a) the enlarged, gripping, lower portion including a series of ribs;
   (b) the series of ribs adding to a gripping power for the accessory mounting device onto the traffic light assembly; and
   (c) the mounting cylinder being above the gripping portion in order to avoid interference with the traffic light assembly.

3. The accessory mounting device of claim 2 further comprising:
   (a) the threaded aperture providing female threads in order to receive a desired device; and
   (b) the threaded aperture being substantially centrally located in the top portion of the mounting cylinder.

4. The accessory mounting device of claim 3 further comprising:
   (a) the female threads providing support for a mounting rod to fit therein;
   (b) the mounting rod being adapted to receive at least one device; and
   (c) the series of ribs being substantially parallel to a cylindrical axis of the accessory mounting device.

5. In a traffic light assembly including a mounting pole with a traffic light housing mounted thereon, the improvement comprising:

(a) an accessory mounting device for the traffic light assembly for supporting an emergency device on the traffic light assembly comprising:
(b) the accessory mounting device having an enlarged, gripping, lower portion and a mounting cylinder;
(c) the enlarged, gripping, lower portion having the mounting cylinder on the top thereof forming the accessory mounting device;
(d) the mounting cylinder having an accessory receiving means;
(e) the accessory receiving means including threaded aperture;
(f) the threaded aperture being situated in a top portion of the mounting cylinder; and
(g) the threaded aperture providing minimal adverse effect on the traffic-light assembly.

6. The traffic light assembly of claim 5 further comprising:
(a) the enlarged, gripping, lower portion including a series of interior ribs;
(b) the series of interior ribs adding to a gripping power for the accessory mounting device onto the traffic light assembly; and
(c) the mounting cylinder being above the gripping portion in order to avoid interference with the traffic light assembly.

7. The traffic light assembly of claim 6 further comprising:
(a) the threaded aperture providing female threads in order to receive a desired device; and
(b) the threaded aperture being substantially centrally located in the top portion of the mounting cylinder.

8. The traffic light assembly of claim 7 further comprising:
(a) the female threads providing support for a mounting rod to fit therein;
(b) the mounting rod being adapted to receive at least one device; and
(c) the series of ribs being substantially parallel to a cylindrical axis of the accessory mounting device.

9. The traffic light assembly of claim 8 further comprising:
(a) a mounting rod cooperating with the accessory mounting device;
(b) the mounting rod having male rod threads thereon; and
(c) the male rod threads communicating with the threaded aperture.

10. The traffic light assembly of claim 9 further comprising:
(a) a first rod nut and a second rod nut supporting the mounting rod;
(b) the first rod nut and the second rod nut being in threaded relation with the mounting rod;
(c) the first rod nut and the second rod nut being situated adjacent to the threaded aperture;
(d) the first rod nut being situated outside of the mounting cylinder; and
(e) the second rod nut being situated within the top portion of the mounting cylinder.

11. The traffic light assembly of claim 10 further comprising:
(a) the mounting rod having the male rod threads within and adjacent to the threaded aperture;
(b) the mounting rod having a mounting bracket oppositely disposed from the male rod threads; and
(c) the mounting bracket receiving a desired device.

12. The traffic light assembly of claim 11 further comprising the desired device being a camera or an antenna.

13. The traffic light assembly of claim 11 further comprising:
(a) the mounting bracket being at least one selected from the group consisting of an attached mounting bracket manufactured as a part of the mounting rod, an added mounting bracket removable attached to the mounting rod and an object mounting bracket as a part of the desired device releasably attachable to the mounting rod;
(b) the enlarged, gripping, lower portion having at least one mounting aperture therein; and
(c) the mounting cylinder having radially spaced thereabouts outer serrations in order to support the traffic light housing.

14. In a method for securing at least one accessory to a traffic light assembly, the traffic light assembly including a mounting pole with a traffic light housing mounted thereon, the improvement comprising:
(a) providing an accessory mounting device for the traffic light assembly for supporting an emergency device on the traffic light assembly comprising:
(b) providing the accessory mounting device with an enlarged, gripping, lower portion and an upper mounting cylinder;
(c) providing an accessory receiving means in the mounting cylinder;
(d) providing a threaded aperture for the accessory receiving means in a top portion of the mounting cylinder; and
(e) the threaded aperture providing minimal adverse effect on the traffic light assembly.

* * * * *